United States Patent
Bettini et al.

(10) Patent No.: US 8,911,595 B2
(45) Date of Patent: Dec. 16, 2014

(54) METHODS AND SYSTEMS FOR FUEL GENERATION

(76) Inventors: Charles Randall Bettini, Browns Summit, NC (US); Deborah Bettini, Browns Summit, NC (US)

(*) Notice: Subject to any disclaimer, the term of this patent is extended or adjusted under 35 U.S.C. 154(b) by 1008 days.

(21) Appl. No.: 13/006,825

(22) Filed: Jan. 14, 2011

(65) Prior Publication Data

US 2011/0185629 A1    Aug. 4, 2011

Related U.S. Application Data

(60) Provisional application No. 61/301,317, filed on Feb. 4, 2010.

(51) Int. Cl.
*B01D 3/14* (2006.01)
*B01D 3/00* (2006.01)
*C10L 1/182* (2006.01)

(52) U.S. Cl.
CPC .. *B01D 3/00* (2013.01); *C10L 1/182* (2013.01)
USPC .......................................... 202/158; 422/610

(58) Field of Classification Search
USPC .............. 585/240; 202/158; 203/19; 422/610
See application file for complete search history.

(56) References Cited

U.S. PATENT DOCUMENTS

| 4,548,615 | A  | * | 10/1985 | Lonchamp et al. | .............. 44/561 |
| 2008/0047822 | A1 | * | 2/2008 | Ling | ................................ 203/19 |
| 2008/0061004 | A1 | * | 3/2008 | Balvanz | ........................ 210/710 |
| 2009/0151251 | A1 | * | 6/2009 | Manzer et al. | .............. 48/197 R |
| 2010/0212220 | A1 | * | 8/2010 | Tirmizi | ........................... 44/389 |

FOREIGN PATENT DOCUMENTS

WO    WO2007095706    *    8/2007

* cited by examiner

*Primary Examiner* — Nina Bhat
(74) *Attorney, Agent, or Firm* — MacCord Mason PLLC

(57) ABSTRACT

Systems, methods and compositions are shown and described. In one embodiment, a method of generating a hybrid liquid hydrocarbon fuel (HLHF) comprises locating a vineyard having a supply of grape waste (GW); loading the GW into a delivery system; delivering the GW to a transformation facility having a GW trough; depositing the GW into the GW trough; distilling the GW into ethanol; and mixing the ethanol with gasoline or diesel, thereby generating the HLHF.

4 Claims, 3 Drawing Sheets

METHODS AND SYSTEMS FOR FUEL GENERATION

RELATED APPLICATIONS

This application claims priority to U.S. Application No. 61/301,317, filed 4 Feb. 2010, there entire contents of which are hereby incorporated by reference.

BACKGROUND

This disclosure is related to systems and methods for the production of fuel, and more particularly, to systems and methods for the production of an ethanol-based fuel using grape waste. The current disclosure is also directed to hybrid fuels.

Winemaking processes are known in the art. While there may be some variability depending on, for example, the maker or type of wine being produced, the process may be summarized as follows: Grapes are harvested, destemmed, crushed, pressed, fermented, and aged to produce the finished wine product. Also produced as a byproduct of winemaking is grape waste (GW). As used herein, GW includes at least one of grape skins, grape seeds, and grape stems produced as a result of a winemaking process.

Applicants have developed systems and methods for using GW to produce fuel.

SUMMARY

To summarize briefly, parts of the disclosure are directed to methods of generating a hybrid liquid hydrocarbon fuel (HLHF). In one embodiment, a method includes locating a vineyard having a supply of grape waste (GW). The GW is loaded into a delivery system and delivered to a transformation facility. Once at the transformation facility, the GW is deposited into a GW trough. The GW is allowed to ferment. Ethanol produced as a result of fermentation is distilled. Ethanol is mixed with gasoline or diesel, thereby generating the HLHF.

In another, similar embodiment, a similar method is used to produce ethanol alone, e.g., the ethanol is not mixed with gasoline or diesel.

The disclosure is also directed to systems for the production of HLHF fuel, e.g. In one embodiment, the system includes a vineyard-depository for GW. The fuel production system also includes a delivery system, e.g. a truck, configured to transport the GW. The system also includes a GW trough for receiving the GW, a distillation system for producing ethanol from the GW, and at least one container for storage or shipping of the fuel.

The disclosure is also directed to hybrid liquid hydrocarbon fuels (HLHF). HLHF fuels may vary from embodiment to embodiment. In one embodiment, the HLHF comprises 1-99 v/v gasoline or diesel, and 1-99 v/v ethanol produced from grape waste (GW). In some embodiments, the HLHF may also include other components, e.g. stabilizers, etc.

The above summary was intended to summarize certain embodiments of the present disclosure. Systems, methods and compositions will be set forth in more detail, along with examples demonstrating efficacy, in the figures and detailed description below. It will be apparent, however, that the detailed description is not intended to limit the present invention.

DETAILED DESCRIPTION OF EXEMPLARY EMBODIMENTS

Figure 1:
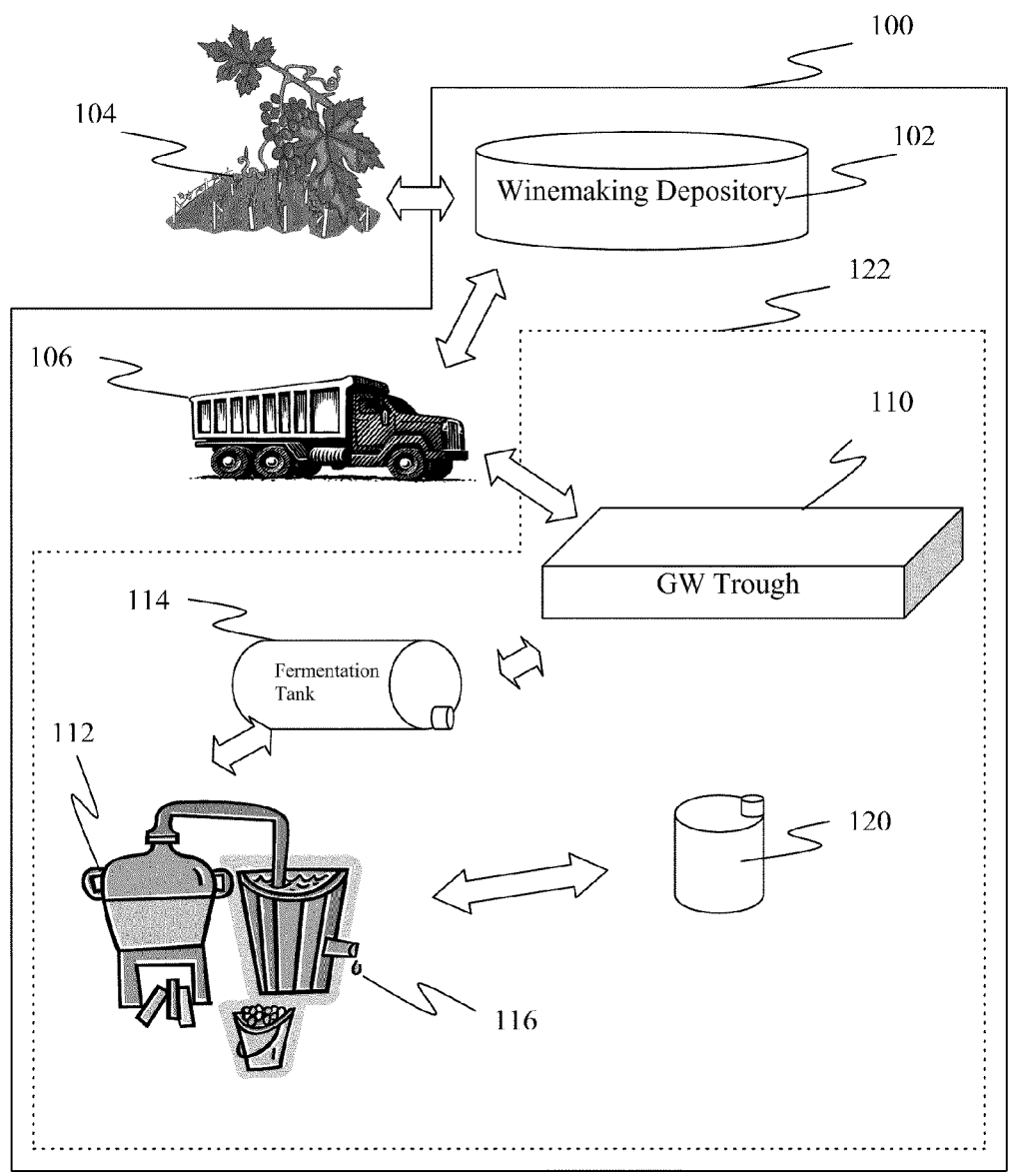
FIG. 1 illustrates one embodiment of a system according to the disclosure.

FIG. 1 illustrates one embodiment of a system 100 containing various components. In this embodiment, system 100 includes winemaking-depository 102 for a grape waste (GW), which may be located on or off of winemaking or vineyard site 104. Winemaking-depositories may vary from embodiment to embodiment, and may have a capacity ranging from about 1 liter to about 10,000 liters. In exemplary embodiments, winemaking-depositories will have a solid bottom configure to prevent carbohydrates and sugars from leaching out of the GW into the ground. Embodiments may also include a lid to isolate the GW from the environment. In other embodiments, winemaking-depositories may not be desired.

Applicants believe that one benefit of the methods and systems disclosed is that they provide a mechanism by which pathogenic host material, i.e. the GW, is readily and profitably removed from the vineyard, thereby improving overall vineyard sanitation. This advantage may be achieved in embodiments using vineyard depositories and in embodiments without such depositories because in both situations, host material will be more rapidly removed from the vineyard.

System 100 also includes delivery system 106 configured to transport the GW. Delivery systems can be configured to transport GW in a variety of ways, e.g., by having a bed with sufficient volume, wall height and density to prevent GW, or containers holding GW, from passing over or through during transport, etc. In the embodiment shown, delivery system 106 is a dump truck having a pivotally mounted bed, thereby allowing for dumping of the GW after loading. In other embodiments, other types of delivery systems may be used, e.g., other types of trucks, trains, boats, planes, shipping containers, etc. In some embodiments, delivery systems will include an engine configured to operate using the HLHF or using ethanol.

Figure 2:
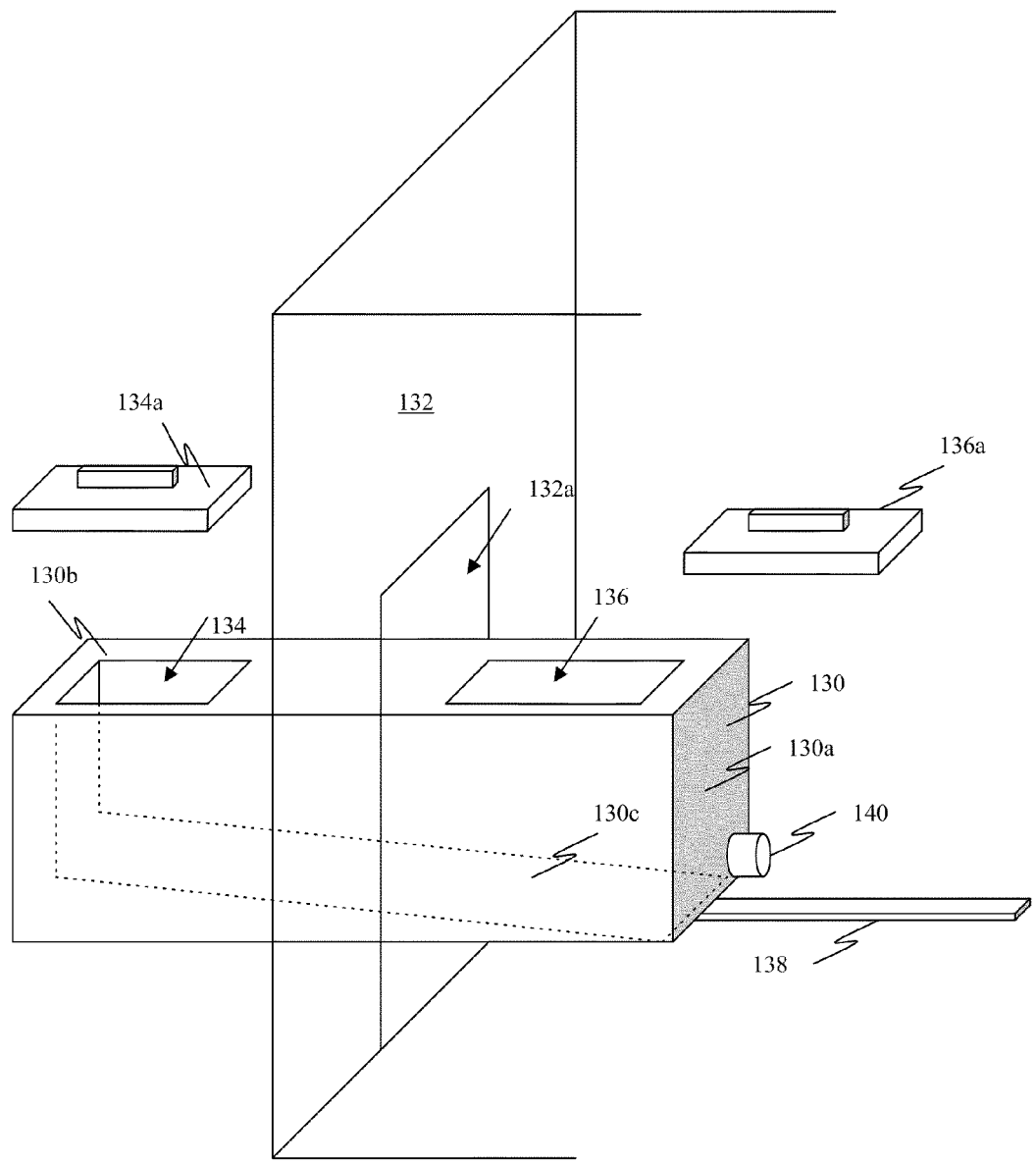
FIG. 2 illustrates an trough embodiment.
Figure 3:
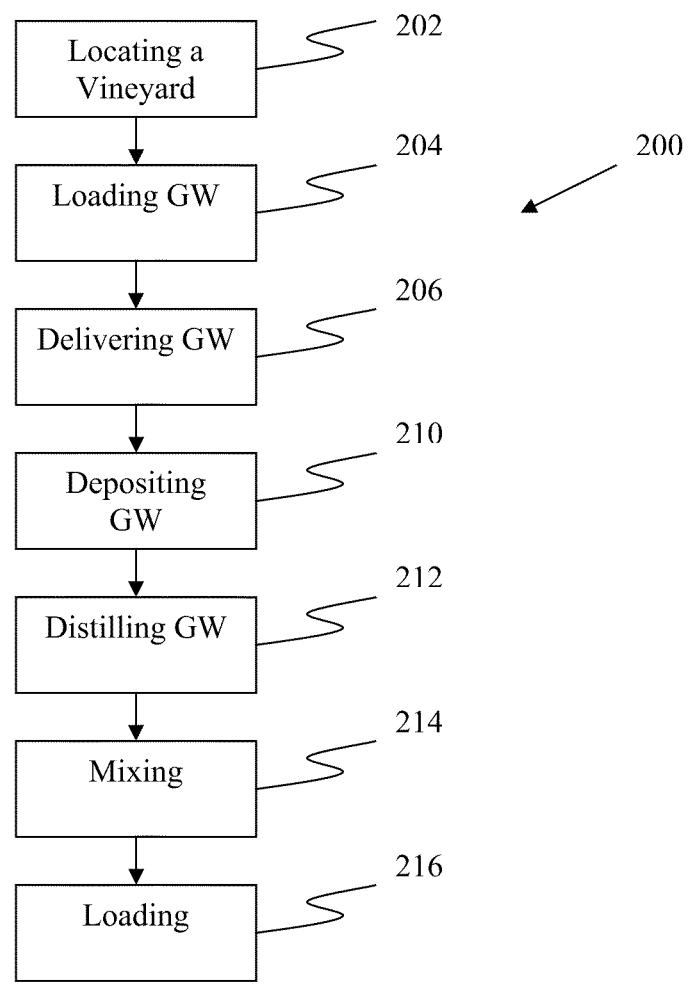
FIG. 3 illustrates one embodiment of a method according to the disclosure.

System 100 also includes GW trough 110. Troughs may vary from embodiment to embodiment. FIG. 2, for example, depicts a transparent view of one trough embodiment, trough 130. In this embodiment, trough 130 is positioned with end 130a within distillery 132 (shown as partial and transparent in locations) and with end 130b outside of distillery 132. Troughs may be, for example, positioned on track 138 to allow for movement into and out of distilleries as needed, or they may be stationary. Distilleries may also often include a trough access door 132a, through which troughs may be positioned.

Outer end 130b includes input opening 134, which is configured receive GW. As used herein, configured to receive GW includes having an opening sized to allow GW to enter the trough. For example, a delivery system, e.g., a dump truck can load GW into trough 130 from outside of distillery 132 by pulling adjacent to trough 130 and empting GW into input opening 134. Input openings may vary from embodiment to embodiment but will typically be defined by an upper portion of the trough, e.g a lid or top.

Inner end 130a includes access opening 136. Access opening 136 allows distillery workers access to GW located inside of trough 130. Workers can stir, press or move GW contained within the trough through this access. Access openings may vary from embodiment to embodiment but will typically be defined by an upper portion of the trough, e.g a lid or top. Also positioned on inner end 130a is batch exit through which GW is moved downstream in the process. Exits may vary, and can include, for example, PVC pipe having a diameter of 3, 6, 8, 10, or 12 inches. A valve (not shown) will also commonly be included. Troughs will also often include distinct elevation regions. In this embodiment, trough 130 defines ramp 130c therein, which is pitched toward batch exit 103a.

Trough construction and dimensions may vary from embodiment to embodiment. In an exemplary embodiment, troughs will be constructed, at least partially, from concrete with a volume capacity of approximately 5000 to 10,000 gallons. An embodiment may for, example, have a capacity of approximately 1,000 gallons. In such an embodiment, the trough may have a depth of approximately 5 feet, a length of approximately 8 feet, and a width of approximately 5 feet. Troughs may often include lids, e.g. lid 134a for covering opening 134 and lid 136a for covering access 136. Lids are desirable to prevent contamination, dilution, and/or evaporation of fermentation products.

System 100 also includes distillation system 112 for producing ethanol from the GW. Distillation systems may vary from embodiment to embodiment. An exemplary system includes a reflux still.

Embodiments may optionally include fermentation tank 114, for fermenting GW prior to distillation.

System 100 also includes at least one container 120 for storage or shipping of the HLHF. In many embodiments, containers will be will be ethanol approved storage or shipping containers.

Systems may also include a mixer for mixing the produced ethanol with at least one of gasoline or diesel. In the embodiment depicted, mixing may be achieved in storage container 120, e.g. by gently shaking the container, but in other embodiments, mixing may be achieved using other components or in other locations.

In the embodiment shown, GW trough 110, fermentation tank 114, distillation system 112, and storage system 120 are depicted within transformation facility 122. In other embodiments the various components of the system may be located in other places.

In addition to systems, the present disclosure is also directed to methods. FIG. 2 illustrates one embodiment of a method 200 for the production of a hybrid liquid hydrocarbon fuel (HLHF). Block 202 represents locating a vineyard having a supply of grape waste (GW). Block 204 represents loading the GW into a delivery system. Block 206 represents delivering the GW to a transformation facility having a GW trough. Block 210 represents depositing the GW into the GW trough. Once inside the trough the GW may be mashed or compressed to further break down GW. GW is moved from the GW trough to the distillation location. Block 212 represents distilling the GW into ethanol.

Block 214 represents mixing the ethanol with gasoline or diesel, thereby generating the HLHF. Mixing may be used to achieve a variety of embodiments, for example HLHF comprising 1-99 v/v gasoline or diesel; and 1-99 v/v ethanol produced from grape waste (GW). In other embodiments, e.g., those designed for ethanol production rather than hybrid fuel production, mixing may be an optional step.

Block 216 represents loading the HLHF into at least one ethanol-approved fuel container, which is an optional step in this embodiment.

Items used in various method embodiments may be any of those described above in the description of the systems, or may be additional items.

In some examples, it will be desirable to perform the methods disclosed herein by a cooperative of participant, e.g., a cooperative of discrete farmers or entities. In these examples, any number of participants may perform any number of steps. For example, the cooperative may include at least two participants, each participant performing at least one of the steps above. Further, participants may be under the control of a centralized organizer, which may or may not perform any of the above mentioned steps.

Using systems and methods described herein, a fuel product can be rapidly and efficiently produced. Preliminary results also suggest an increase in ethanol concentration of several percent relative to known methods.

Numerous characteristics and advantages have been set forth in the foregoing description, together with details of structure and function. The disclosure, however, is illustrative only, and changes may be made in detail, especially in matters of shape, size, and arrangement of parts, within the principle of the invention, to the full extent indicated by the broad general meaning of the terms in which the general claims are expressed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range.

It is further noted that, as used in this specification, the singular forms "a," "an," and "the" include plural referents unless expressly and unequivocally limited to one referent.

What is claimed is:

1. A system for the production of a hybrid liquid hydrocarbon fuel (HLHF), the system comprising:
    a vineyard-depository for a grape waste (GW) consisting of grape solids and liquids;
    a single feed delivery system configured to transport the GW;
    a concrete GW trough having a downward pitched floor elevation comprising:
        an outer end having an input opening adapted to receive solid and liquid GW from an external source, and
        an inner end having an access opening adapted to provide access to GW inside of the trough and a batch exit adapted to move GW to a downstream distillation system, and
        wherein said distillation system in operative connection with concrete reinforced holding system; and
    at least one container for storage or shipping of the HLHF.

2. The system of claim 1, further including a mixer for mixing the produced ethanol with at least one of gasoline or diesel.

3. The system of claim 1, wherein the GW trough includes at least two ends in operative connection with a distillery having an input opening configured to receive GW, an inner end including an access opening configured to allow access to GW located inside of the trough, a batch exit through which GW is moved downstream in the process, and a pitched floor.

4. The system of claim 1, further including a gasification system for producing ethanol from GW.

\* \* \* \* \*

UNITED STATES PATENT AND TRADEMARK OFFICE
CERTIFICATE OF CORRECTION

PATENT NO. : 8,911,595 B2  
APPLICATION NO. : 13/006825  
DATED : December 16, 2014  
INVENTOR(S) : Bettini Page 1 of 1

It is certified that error appears in the above-identified patent and that said Letters Patent is hereby corrected as shown below:

In The Specification

In Column 1, line 53, 1-99 should read "1-99%"

In Column 1, line 53, the second occurrence of 1-99 should read "1-99%"

In Column 3, line 56, 1-99 should read "1-99%"

In Column 3, line 56, the second occurrence of 1-99 should read "1-99%"

Signed and Sealed this  
Seventh Day of April, 2015

Michelle K. Lee  
*Director of the United States Patent and Trademark Office*